(12) United States Patent
Singhal

(10) Patent No.: US 9,088,595 B2
(45) Date of Patent: *Jul. 21, 2015

(54) METHOD AND APPARATUS FOR PACKET SOURCE VALIDATION ARCHITECTURE SYSTEM FOR ENHANCED INTERNET SECURITY

(71) Applicant: Tara Chand Singhal, Torrance, CA (US)

(72) Inventor: Tara Chand Singhal, Torrance, CA (US)

(\*) Notice: Subject to any disclaimer, the term of this patent is extended or adjusted under 35 U.S.C. 154(b) by 71 days.

This patent is subject to a terminal disclaimer.

(21) Appl. No.: 13/778,032

(22) Filed: Feb. 26, 2013

(65) Prior Publication Data

US 2014/0245383 A1 Aug. 28, 2014

Related U.S. Application Data

(63) Continuation of application No. 11/125,675, filed on May 10, 2005, now Pat. No. 8,423,758.

(51) Int. Cl.
*H04L 29/06* (2006.01)
*H04W 12/04* (2009.01)
*H04W 12/06* (2009.01)

(52) U.S. Cl.
CPC ............ *H04L 63/126* (2013.01); *H04W 12/04* (2013.01); *H04W 12/06* (2013.01)

(58) Field of Classification Search
CPC ..... H04L 63/08; H04L 63/126; H04W 12/04; H04W 12/06
USPC .................................................. 726/2
See application file for complete search history.

(56) References Cited

U.S. PATENT DOCUMENTS

| | | | | |
|---|---|---|---|---|
| 4,625,081 A | * | 11/1986 | Lotito et al. | 379/88.26 |
| 5,613,069 A | * | 3/1997 | Walker | 709/238 |
| 6,553,110 B1 | * | 4/2003 | Peng | 379/210.03 |
| 2003/0142673 A1 | * | 7/2003 | Patil et al. | 370/392 |
| 2003/0172177 A1 | * | 9/2003 | Kersley et al. | 709/236 |
| 2004/0098620 A1 | * | 5/2004 | Shay | 713/201 |

\* cited by examiner

*Primary Examiner* — Michael S McNally
(74) *Attorney, Agent, or Firm* — Steve Roeder, Esq.

(57) ABSTRACT

A system of enhanced global computer network security provides for a globally unique human signature code that is provided in the header of a data packet and that is used to uniquely identify a sender of a data packet in a global computer network. The signature code is of the form that identifies the source as an owner of the server that has control over the server that originated the data packet. The signature code includes, (i) a caller id of a mobile telephone provided by a cellular telephone network, (ii) time and date of a call to a key server, (iii) cellular network identification of the geographic location of the caller, and (iv) a random code.

10 Claims, 9 Drawing Sheets

METHOD AND APPARATUS FOR PACKET SOURCE VALIDATION ARCHITECTURE SYSTEM FOR ENHANCED INTERNET SECURITY

CROSS REFERENCE TO RELATED APPLICATIONS

This application is a continuation of application Ser. No. 11/125,675, entitled "Method And Apparatus For Packet Validation Architecture System For Enhanced Internet Security" with a filing date of May 10, 2005, by Tara Chand Singhal.

FIELD OF THE INVENTION

The present invention is directed to a method and apparatus for enhancing Internet infrastructure security using packet source validation architecture that validates the source of each data packet that is sent over a global computer network (Internet).

BACKGROUND

Internet was designed for transporting data packets over a distributed network from a sending computer to a receiving computer. An Internet Protocol (IP) is used for transporting data between nodes of the global computer network, popularly known as Internet. The IP protocol assigns each computer a unique IP address in the form of a hierarchical sequence of numbers, where each sequence is limited in size to 256. For example the IP address may be 54.29.40.97, where 54, the first sequence refers to the first or root level router identification and so on.

The data between the routers is routed in the form of a data packet. A data packet has a header part and a data part. The data part is also referred to sometimes as a payload. The header part contains essential information for the packet to be routed to the destination computer or node. The header part contains header information such as receiving computer IP address and sending computer IP address, and a few other data fields. The data part contains the data that is being used to send to the destination computer. The data part may pertain to any application, data, or any command that is sent to or needed by the destination computer and may have its own application specific format and content. For example, the data part may contain the remote user authentication data of a password and user id. The data part can be encrypted or it can be plain text. For example, when communicating to a secure https:// server, the data part is always encrypted. The size of the data part is limited. If the data to be sent cannot be accommodated in one packet, then the sending computer breaks the data into a series of one or more packets and the packets are then sequentially numbered. The destination computer can then reassemble the original data file from these sequences of packets.

The information in the header part of the data packet is always plain text that is un-encrypted. The information in the header is used by a network of routers to route the packet to the destination computer.

The routers in the network are also able to decide the best path to route the data packet. There are specific router protocols such as Transmission Control Protocol (TCP) that the routers use to communicate with other routers of the global network to learn the health and status information about these routers. One example of TCP is a data ping that is sent to another router, and the router responds with the same data indicating that the router is alive and functioning. Thus the routers of the network use router protocols to check the status of other routers to determine a most efficient routing path for a data packet.

When the packets are routed over the network of routers, each successive router check the destination IP address in the header to determine the best routing path and deliver the packet to the destination computer. The data packets that have not reached their destination in sixteen hops are considered lost and dropped by using a time-to-live (TTL) field in the header. The routers, by design, never check the data part of a packet and are limited by their design to find the destination IP address and find the best routing path.

Therefore, the routers that are the basic transport mechanism of the Internet have no underlying mechanism to be able to validate the source of the data packet. The identification of source of a packet is in the form of an IP address. This IP address is created and can be changed or altered to be set at any value by the source computer. Therefore, the destination computer cannot truly know where the packet came from or which computer it originated from.

In not being able to validate the source of data packets is a fundamental security weakness of the Internet. Since there is no certainty that the sender of these data packets is who it says it is, the current Internet infrastructure may allow entry of data packets into a network that are harmful to a destination computer. The harm that may be caused to the destination computer may take any number of forms such as, deleting files, crashing the system, making the system unavailable for some time to the users, stealing data files, and many other known and as yet unknown types of harm. This security weakness is exploited in many different ways by all types of hackers and people intent on causing harm or to have fun. That is the reason various types of worms, virus and other mischief can enter and circulate on the global network from any part in the world.

The current security technologies leave it entirely up to the destination computer to screen the incoming data packets. To accomplish this purpose, current technologies provide various types of firewalls and intrusion detection and intrusion prevention systems, which operate at the packet level. Other security technologies such as virus checkers and application specific proxy firewalls operate at the file level. Yet another security technology of remote user authentication via user id and password operates at the session level.

The entire information security industry is geared towards providing better and improved forms of these tools to protect the destination computer from data packets that may be harmful to the destination computer. This approach to security leaves the sender of harm causing data packets to keep on trying sending the harm causing packets and the businesses to defend themselves from such attacks and intrusions on a continual basis. That explains, why, over the years, there has been such a large proliferation in different types of threats in the form of harm causing packets that are sent via the servers or via the e-mail servers. As soon as the destination computers implement a defense mechanism, against a known type of threat, the senders employ different techniques to defeat that defense by creating new type and variety of harm causing packets.

Using this inherent weakness, new types of harm are discovered and exploited on a regular basis. For example, in a recent news story, titled "New Virus Snarls Thousand of Computers" by Anick Jesdanun dated May 3, 2004, says "Unlike most outbreaks, the Sasser worm does not require users to activate it by clicking on an e-mail attachment. Sasser is known as a network work because it can automatically scan the Internet for computers with the security flaw and send a copy of itself there."

In light of the above, it is an objective of the present invention to create an adaptation of or improvements in the global computer network structure that would enhance security and potentially guard against all these type of threats.

SUMMARY

The present invention is directed to a method and apparatus for adaptation of the global network for providing enhanced security. The adaptation validates the sources of data packets entering the network. The adaptation rejects those data packets that are not source validated. The adaptation includes packet level authentication for all incoming data packets from a source computer before routing them to the destination computer.

There are two embodiments. First embodiment validates source of all data packets that are sent over the Internet. The second embodiment validates the source of all e-mail data packets.

For the first embodiment, the invention discloses a Packet Source Validation Architecture (PSVA) system that has a set of Key Servers, adapted major routers, and a Client Security Function in the sending and receiving clients. The PSVA system enables the source of each data packet to be validated by the major routers with the help of the Key Servers.

The PSVA system provides enhanced network access security by providing a solution to the fundamental weakness of the Internet architecture in not being able to authenticate the source of the packets entering the data packet. These security enhancements, it is believed will discourage the senders from sending harm causing data over the Internet.

For the e-mail security embodiment, the Packet Source Validation Architecture (PSVA) system has a set of key servers and adapted mail servers. The PSVA system enables either the sending mail clients or the sending servers to insert a source validation code in the header of outgoing packets and the destination mail servers can validate the code with reference to the key servers.

The PSVA system thus provides enhanced e-mail security by providing a solution to the fundamental weakness of the Internet architecture in not being able to authenticate the source of the e-mail data packets entering the packet. These security enhancements, it is believed will discourage the senders from sending harm causing e-mail over the Internet.

BRIEF DESCRIPTION OF THE DRAWINGS

The novel features of this invention, as well as the invention itself, both as to its structure and its operation, will be best understood from the accompanying drawings, taken in conjunction with the accompanying description.

DESCRIPTION

Introduction

Figure 1A:
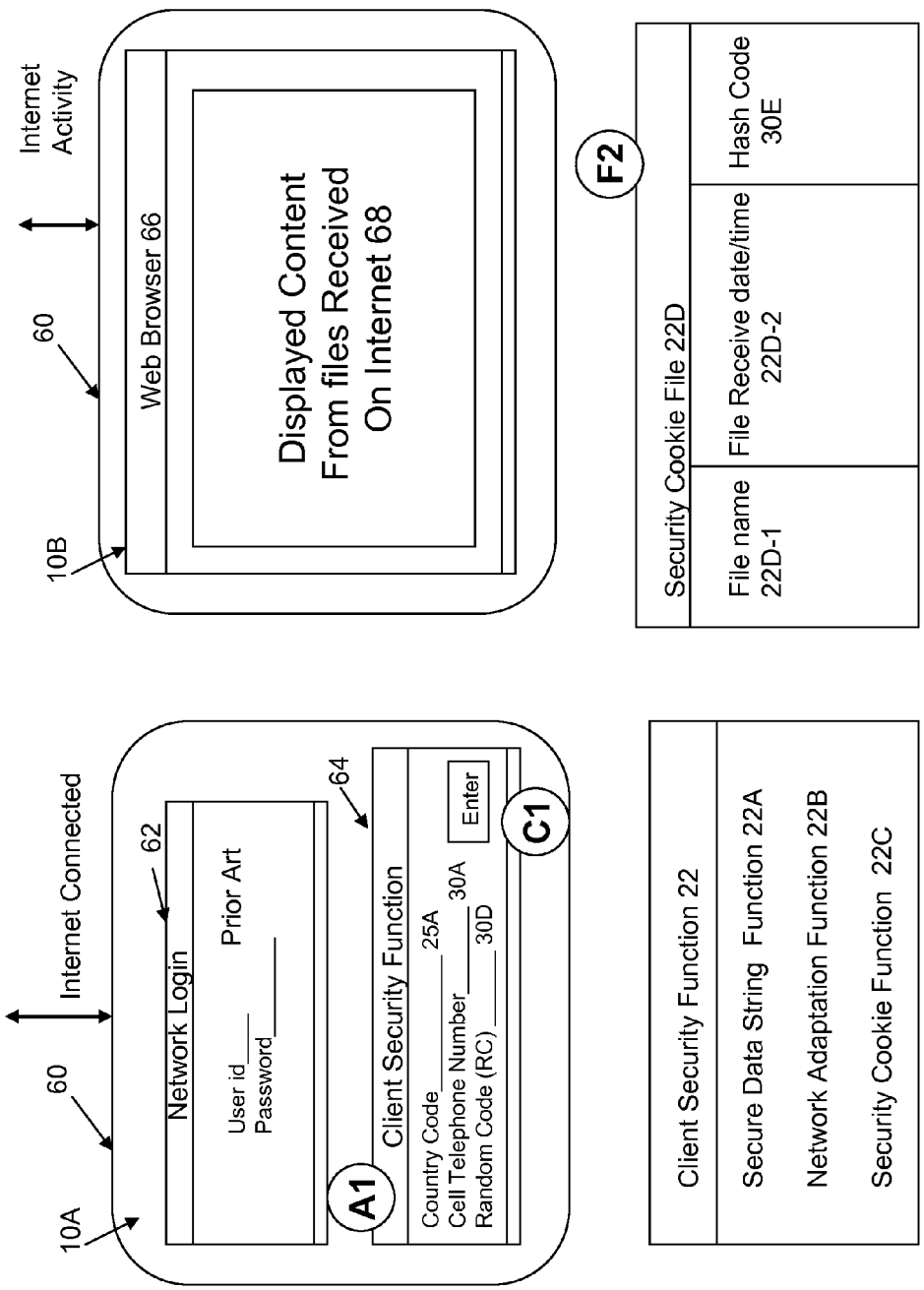
FIG. 1A-B is a block diagram that illustrates the operation of a version of the Packet Source Validation Architecture for enhanced Internet security of the current invention.

Computing devices called routers are the basic transport mechanism of the Internet. Routers route data packets from the sending computer to the destination computer using an IP address in the header part of each packet. The routers have no underlying mechanism that would validate the source of the data packet. This invention provides a solution to this inherent weakness of the Internet.

There are two embodiments to this invention. One embodiment provides for the validation of the source of all packets from wherever they enter the network. The second embodiment is limited in scope to provide validation of only the e-mail packets that travel from one mail server to another mail server on the Internet.

Both of these embodiments use a Packet Source Validation Architecture (PSVA) System. The PSVA system is used to validate the source of the data packet in such a manner that the source of the data packet remains hidden and is revealed only to a law enforcement agency. Thus, the PSVA system provides a system of checks and balances that does not hinder the ability of people to communicate freely. But at the same time, if a person sends a data packet that causes harm from one of the list of approved harms, then the sender of the data packet can be found and prosecuted by the law enforcement.

Internet is international in scope and has widespread users. Therefore the PSVA system of this invention is also international in scope as well and can be used by anyone, anywhere.

The PSVA system leverages another global network with wide accessibility and an extremely large number of users, believed to be as large or even larger than the users of the Internet. That global network is the telephone network, including both the mobile cellular phones that integrate with this network, as well as the existing landline network.

With the cost efficiency and easy availability of the mobile phones, the mobile phones are now used by the masses, in both the developed and the third world countries. In a recent news report on the manufacturers in Telecom industry, titled "Global mobile phone market explodes in first quarter: study", dated Apr. 29, 2004, notes that it is estimated that 586 million mobile phones will be sold in 2004 worldwide. An important feature of the global telephone network is that it is widely available and widely used, as this one statistic demonstrates.

Another important feature of the telephone network is the caller id feature. The caller id feature enables a party being called to know the number from which the call originated. That is true for both the landlines as well as the mobile phones. While the landlines are fixed to a location, the mobile phones are movable and are in the custody of an individual owner. This difference does not affect the caller id features of the telephone network and this feature may be used as a means for a remote identification as described below.

Each mobile phone, as part of their manufacturing process has a built-in device identification numbers, sometimes called ESN, short for electronic serial number. Each phone, when it is given to a customer, is personalized to that customer by a subscriber identity module (SIM) card. The SIM card has a number, which embeds an encryption key and a set of numbers that personalize the device to an individual owner. The SIM card is inserted in the mobile device. In addition to the device id and the SIM card, identification in the form of a telephone number is assigned to the phone and the customer. The telephone number maps to the device id and the SIM and is only maintained in the databases of the telephone network and is not embedded in the mobile phone. When a mobile phone is used to make a connection, it sends the ESN and the SIM data and uses the encryption to encrypt the communication. The telephone network, when it receives a communication from the mobile phone, associates the ESN and the SIM data within its database and uses the pre-stored database information to verify the device, the SIM and the encryption key and then associate the communication with a telephone number. When the network switches the connection to the destination telephone number, it forwards the telephone number as an encoded signal on the line so that the receiving telephone, if equipped with caller id circuitry, can decode the number being called from and display it on the receiver phone.

Since each mobile phone has three unique sets of numbers associated with it, a device id, a SIM and a telephone number, which are used by the telephone network for verification, security and accounting functions, the caller id acts as a form of a national identification mechanism without doing anything more. The telephone companies, in addition to assigning a telephone number may also assign an account id. The telephone number is now portable, enabling a customer to keep the same number when changing telephone companies.

This invention leverages these powerful identification and security abilities of the telephone network to provide Packet Source Validation Architecture for validating the source of the data packets entering the global network.

Some information security experts have the opinion that the caller id feature of a telephone network is a weak form of identification because (i) anyone can make a phone call from another's phone, when the phone is stolen, lost or given away and (ii) somehow the personnel of the telephone company can be deceived or duped or bribed to make the caller id ineffective as a fool proof identification mechanism. For example, an identity thief may open a telephone account in someone else's name.

However, the telephone network is part of an important national communication infrastructure that is vital to the nation. Therefore, the telephone companies expend adequate resources to maintain the integrity, availability, and the security of the network. Specifically the mobile phones have the feature, where the telephone company knows the cell location where the call originated. In future, more precise location information as part of 911 emergency-system will also be provided in the mobile phones. The PSVA adds additional layers of security in a Call Security Function, which are described later. In spite of the caller id weaknesses, the caller id feature of mobile telephones with call security function would provide adequate security in knowing where a call originated, and would help law enforcement and the telephone companies to investigate fraudulent practices.

These and other aspects of the invention are described below in detail, where the headings are provided for the convenience of the reader.

Packet Source Validation Architecture System

The PSVA system is used as a system of checks and balances for enhanced Internet security. The PSVA system of checks and balances includes: (i) a system means to insert a source validation code in the header of the packets entering the Internet, (ii) a system means wherein the source validation code does not identity the source of the packets to anyone except to a law-enforcement agency, (iii) a system means to transport such a packet from the sending computer to the destination computer over the existing global computer network, (iv) a means for packet receiving clients to forward the validation code therein to law-enforcement agencies, when an identified type of harm is detected in the data of the received packets.

For the first embodiment, the PSVA system is made up of (i) a distributed set of key servers and (ii) an adaptation of the major routers of the Internet. For the second embodiment, the PSVA system, when restricted to the e-mail security, is made up of (i) a distributed set of key servers and (ii) an adaptation of the mail servers. This later application is flexible in scope and implementation in that all mail servers do not need to be adapted at the same time.

First Embodiment

Figure 1B:
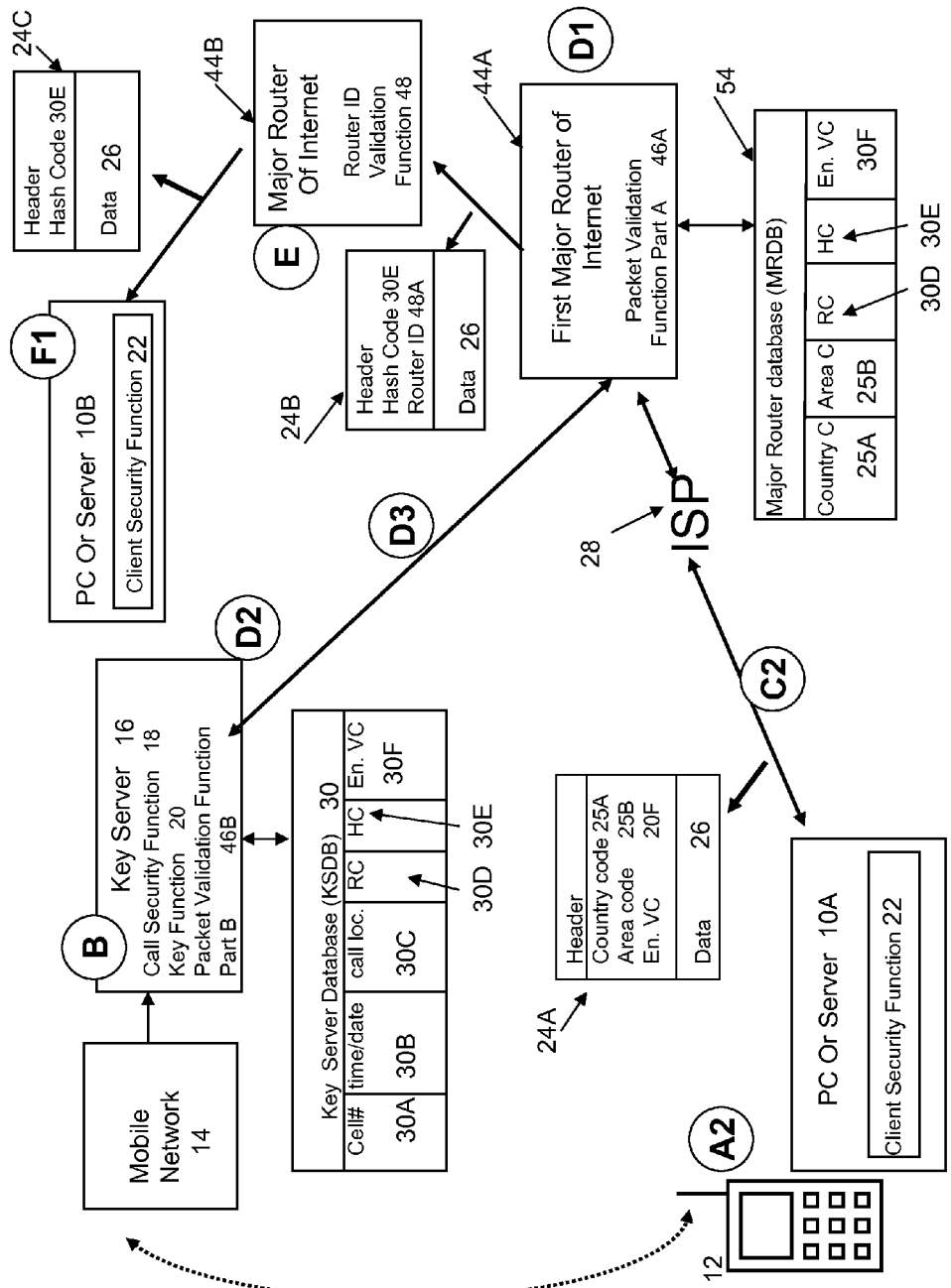

As a simplified illustration, the operation of the first embodiment of the PSVA system is described here with reference to FIG. 1A and FIG. 1B, which are one diagram but illustrated on separate sheets due to the size of the diagram.

At Step A1, as in FIG. 1A, a user or sender of the data over the Internet using a computer 10A, looking at a display screen 60, with a prior art network login window 62, when connected to the Internet for the first time, is also presented a Client Security Function Screen 64, requiring input of country code 24A, cell phone number 30A, and a random code 30D.

At Step A2, as in FIG. 1B, a sender of the data over the Internet, a person acting for himself or for an entity, using his/her mobile phone 12, via mobile telephone network 14, calls a Key Server (KS) 16. The specific KS to be called is identified by a special telephone number within that area code of the telephone, for a specific country code.

At Step B, as in FIG. 1B, the key server 16 performs a Call Security Function 18 and then a Key Function 20 to generate a random code (RC) 30D, that is limited in length. The RC may be a 4 to 6 digit numeric. It may also be alphanumeric. The key server 16 voice-delivers the RC 30D to the caller 12, and records the data for this call in a key server database (KSDB) 30. The data recorded in the KSDB 30 may include: cell telephone number or caller id 30A, date and time stamp of the call 30B, the call origination cell identification 30C, and the RC 30D. In addition, a computed encrypted validation code (EVC) 30F, and a computed hash code (HC) 30E are also recorded in the KSDB 30. Encrypting the caller id and the random code with the random code as the encryption key makes up the EVC. The EVC 30F thus hides both the caller id 30A and the random code 30D. The HC 30E is a hash encryption function on the entire record. The hash encryption is prior art and may use a one-way hash encryption algorithm such as MD5 or SHA.

The preferred embodiment for receiving the RC 30D by caller 12 is via voice due to security reasons. The RC may be delivered in other ways as well. When it is received via voice, it is one continuous operation of calling the key server 16 and within less than a minute hearing the RC 30D. This requires a person with a cell phone 12 in the loop of receiving the RC and using it in the next step.

At Step C1, as in FIG. 1A, the caller then enters this RC 30D along with the telephone number 30A and a telephone system country code 24A in a Client Security Function window 64 that is generated by a Client Security Function 22 in an adapted operating system in the client 10A or the sending server. The adapted client operating system, from this entered information, creates a Secure Data String (SDS) using a Secure Data String Function 22A. The SDS is made up of country code, area code and an encrypted validation code, where the random code is used as the encryption key.

Figure 4A:
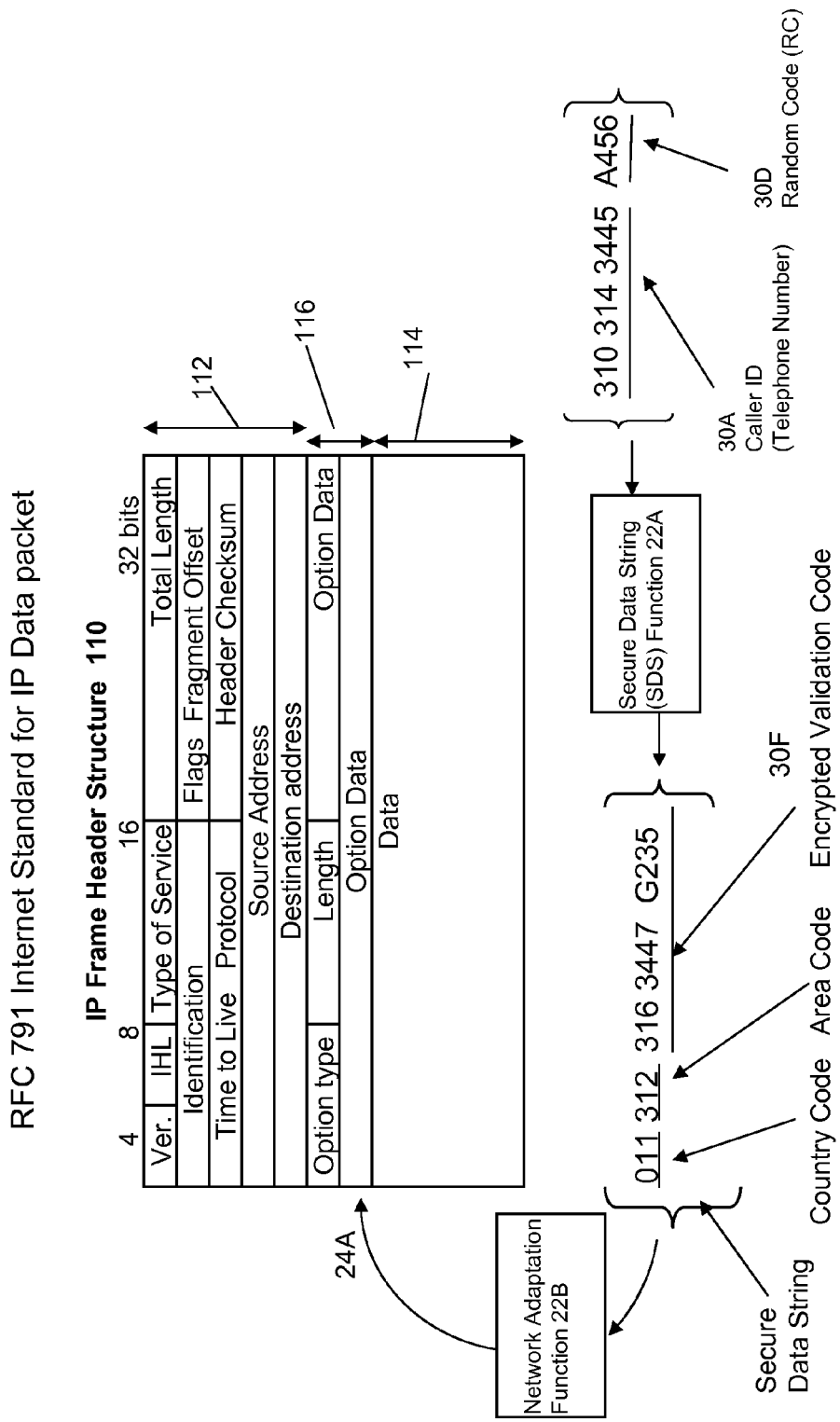
FIG. 4A is a block diagram that illustrates placement of secure data string in the outgoing packet header of the current invention.

At Step C2, as in FIG. 1B, the adapted operating system of the client or sending server 10A temporarily stores this secure data string and embeds the string in the header of each outgoing data packet 24A that has a data part 26, that is sent to the Internet via the Internet Service Provider (ISP) 28. The standard that governs data packets, RFC 791, as illustrated in FIG. 4A, permits adding optional data items in the header of the packet.

As shown in FIG. 1A, the Client Security Function 22 has three functions of: Secure Data String Function 22A, Network Adaptation Function 22B, and Security Cookie Function 22C. The operation of these functions is described later in the description.

At Step D1, as in FIG. 1B, the first major router 44A of the global network that first receives this packet 24A performs a packet source validation function 46 for each packet. The packet validation function has two parts Part A and part B. The packet validation Function part A 46 A is resident in the major router 44A, while the packet validation function part B 46B is resident in the key server 16. The packet validation by the packet validation function 46A is performed first with the help of a Major Router Database (MRDB) 54. If the packet validation is successful, the data packet 24B is routed further with an added router id code 48A in the packet header, which enables the subsequent routers 44B to not repeat the packet validation.

At Step D2, the packet validation function 46B in the specific key server 16 receives the query and validates the query with the key record data present in the key server database (KSDB) 30. The query results are sent to the router 44A and may include a Hash code (HC) 30E. The key server 16 creates the HC 30E by hashing all items of this key record. The results of the packet validation query to the key server 16 are saved in the Major router database 54 by the router 44A, so that the subsequent packets from the same source 10A can be validated with reference to the major router database 54 only, without the need to send a packet validation query to the Key server 16.

Figure 4B:
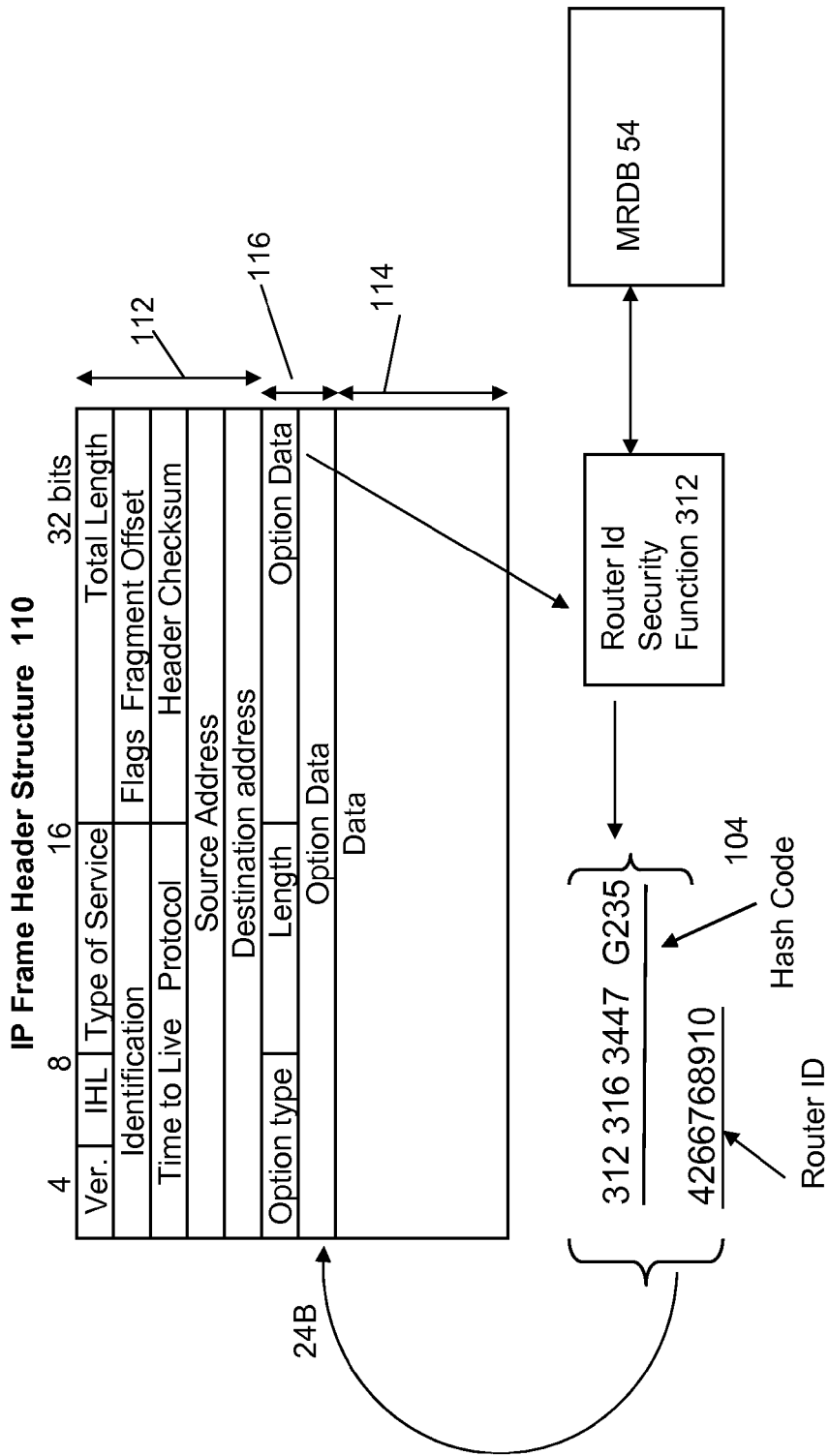
FIG. 4B is a block diagram that illustrates placement of hash code and router id in the packet header of data packets that travel between routers of the Internet.

As an optional step, the packet validation function replaces the SDS in packet header 24A with the Hash code 30E and adds a router id 48A in the packet each header 24B. The standard that governs data packets, RFC 791, as illustrated in FIG. 4B, permits adding optional data items in the header of the packet. The hash code 30E does not have information on the country code 25A and the area code 25B of the caller 12. The router id 48A identifies the router 44A, which performed the packet validation function 46 on this data packet.

At Step D3, as in FIG. 1B, if the packet validation is unsuccessful with the help of the Major Router database 54, a validation query is sent to a Key server 16 over the network, where the specific key server 16 to be used is identified by the country code 25A and the area code 25B that are present in the packet header 24A as part of the Secure Data String.

At Step E, as in FIG. 1B, after the packet has been source validated and routed to the other major routers 44B, the subsequent routers 44B can check the valid router id code 48A to decide not to repeat the packet validation performed by the first router 44A. As an optional security, the subsequent router 44B, if routing to a sub-network, also removes the router id 48A, as in packet header 24C, to keep it from being disseminated out of the major router network. Thus the packet header 24C only has the hash code 30E.

At Step F1, as in FIG. 1B, the destination computer 10B using Client Security Function 22, and as in FIG. 1A, using the Security Cookie Function 22C, extracts the Hash code 30E, from the data packets and saves it in a security cookie file 22D along with the name of the file 22D-1 and the date of the file 22D-2 in which the data packets had the specific hash code 30E before displaying the file contents as 68 in a browser 66 on the display screen 60 of destination server 10B.

At Step F2, as in FIG. 1A, the contents of the security cookie file 22D can be later used by a law enforcement agency if the received file has caused a specific harm from the list of approved harms. The agency with the help of the Key Server 16, by reverse look-up of the Hash code 30E, can determine the caller id 30A, the date and time 30B, and the originating cell location 30C of the call in the Key server database 30.

Second Embodiment

Figure 2A:
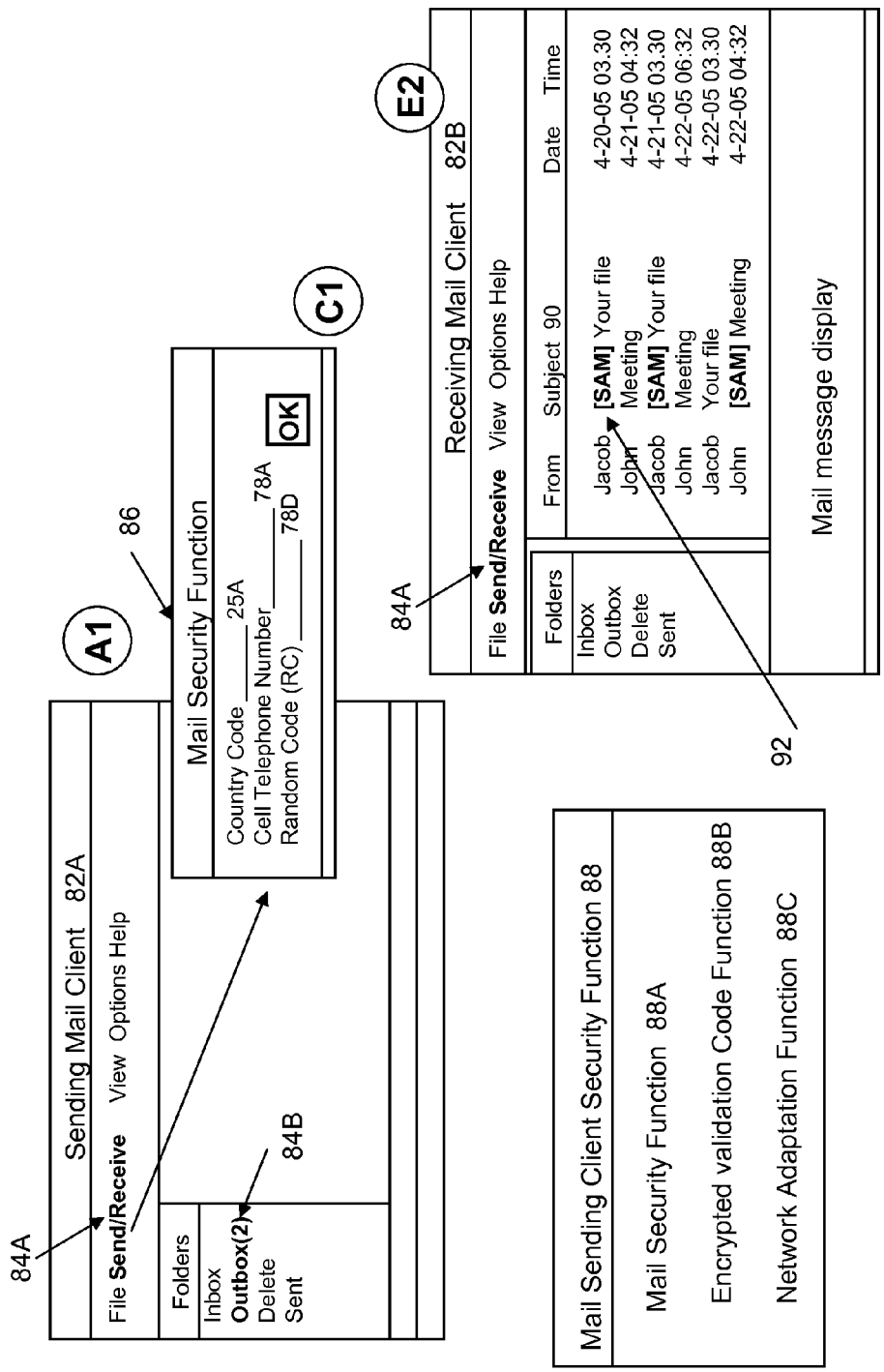
FIG. 2A-B is a block diagram that illustrates the operation of a version of the Packet Source Validation Architecture for enhanced e-mail security of the current invention.
Figure 2B:
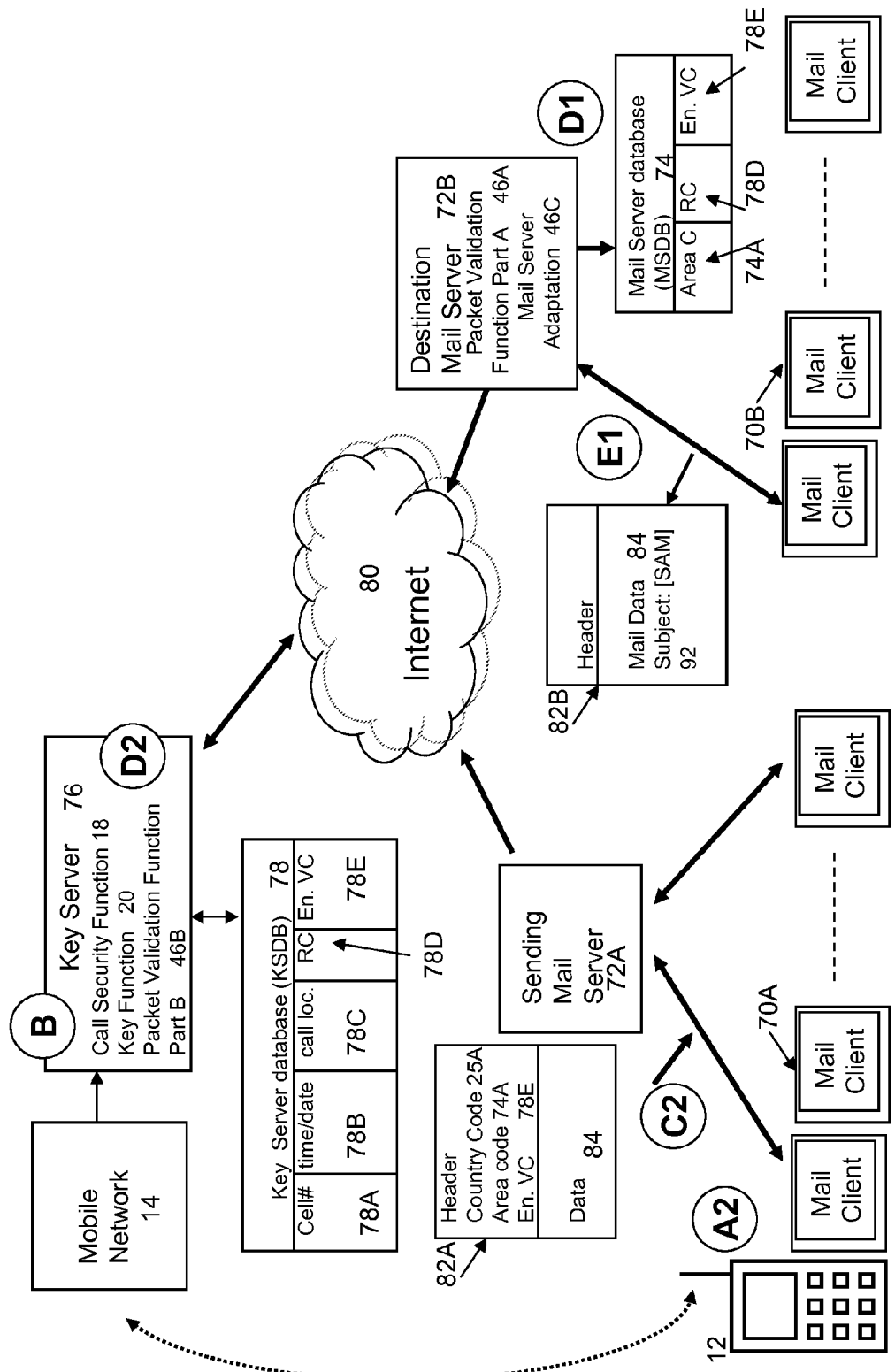

A simplified illustration of the operation of the second embodiment of the PSVA system that is restricted to the e-mail security is described here with reference to FIG. 2A and FIG. 2B, which are one diagram but illustrated on separate sheets due to the size of the diagram.

At Step A1, as in FIG. 2A, a sender of e-mail, having a Sending mail client screen 82A, when has outgoing messages as indicated by outgoing folder 84B, and then activates the Send/Receive function 84A, of the mail client, on these two events, activates a mail Security Function 88, which display a mail Security function window 86.

At Step A2, as in FIG. 2B, a sender of e-mail, a person acting for him/her self or for an entity, using his/her mobile phone 12, using mobile network 14, calls a Key Server (KS) 76. The specific KS 76 to be called is identified by a special telephone number within that area code of the telephone, for a specific country code.

At Step B, as in FIG. 2B, the key server 76 performs a Call Security Function 18 and then using Key Function 20, generates a random code (RC) 78D that is limited in length. The code 78D may be a 4 to 6 digit numeric. It may also be alphanumeric. The key function 20 voice-delivers the RC 78D to the caller 12, and records data for this call in a key server database (KSDB) 78. The data recorded in the KSDB 78 may include: caller id 78A, date and time stamp of the call 78B, cell location 78C, random code (RC) 78D, and an encrypted validation code (EVC) 78E. Encrypting the caller id 78A and the random code 78D with the random code 78D itself as the encryption key makes the EVC 78E. The EVC 78E thus hides both the caller id and the random code.

At Step C1, as in FIG. 2A, the caller then enters this random code 78D, along with the country code 25A, and the cell telephone number 78A in the mail Security Function Window 86 and activates it by OK, which activates a Mail Sending Client Security Function 88, in an adapted mail client 70A, as in FIG. 2B.

If a web-mail application is used, the adapted sending mail server 72A generates the Mail Security window 86. The adapted mail client program 88 or the adapted mail server 72A from this entered information creates a secure data string that is made up of country code, area code and an encrypted validation code, where the validation code is made up of the telephone number and the random code and is then encrypted using the random code as the encryption key.

At Step C2, as in FIG. 2B, the adapted mail program 88 of the client 70A or the adapted mail server 72A temporarily stores this secure data string and embeds the string in the header of each outgoing header packet 82A with packet data 84, that is sent to the Internet 80 for mail from this particular client 70A. Each time a mail client or the web mail server is invoked for sending mail, this process step is repeated.

At Step D1, as in FIG. 2B, the destination mail server 72B performs a packet validation function 46 for each incoming mail packet.

The packet validation function has two parts Part A and part B. The packet validation Function part A 46 A is resident in the destination mail server 72B, while the packet validation function part B 46B is resident in the key server 76. The packet validation by the packet validation function 46A is performed first with the help of a Mail Server Database (MSDB) 74. If the validation is successful, the packet is routed to the destination mail client 70B. If the validation is unsuccessful with the help of the Mail Server database 74, a validation query is then sent, by the mail server 72B to a Key server 76 over the Internet 80, where the key server 76 is the one that is identified by the country code 25A, and the area code 74A, that is present in the packet header 82A as part of the secure data string.

At Step D2, as in FIG. 2B, the packet validation function 46B in the specific key server 76 receives the query and validates the query with the key record data present in the key server database 78.

At Step E1, as in FIG. 2B, the destination mail server 72B removes the secure data string from the packets 82B, annotates the mail as validated by placement of sender assured mail, [SAM] annotation in the subject of the mail 92, and forwards the e-mail to the mail client 70B. If optionally the RC was also used to encrypt the message content, the message content is decrypted using the RC 30D by the destination mail server 72B.

At Step E2, as in FIG. 2A, the receiving mail client 82B displays the sender assured mail [SAM] notation 92 in the subject field 90. The receiver of mail may then choose to open only the messages with [SAM] notation and may choose to discard those messages that are without a [SAM] notation in the subject field. Having a [SAM] notation in each e-mail assures the mail receiver that the sender of the mail has been assured and can be identified if necessary by law enforcement, if the mail does contain harmful contents.

Alternatively, and optionally, the destination mail server 72B, for those messages, that do not have a validated SAM notation, may store such messages for later analysis and only forward those messages that have [SAM] notation to the mail client 70B.

The later analysis by destination mail server 72B may include, (i) detailed examining of the mail for harm, and/or (ii) for sending a return notification to the mail sender client 70A on a procedure on how to use this security feature, and (iii) advising mail sending client 70A that their mail without such a SAM is not being forwarded to the mail recipient 70B and is being delayed and then deleted by mail server 72B.

Key Server 16, Call Volume and Internet Traffic

The initial process or step of making a call to the key server, as in Step A2, and voice receiving a random code 30D or 78D for mail security, is made only once by caller 12. It can then be repeated, as often or as less frequently as required. There are many factors that may be used to decide how often the calls should be made. On each call, a new random code 30D or 78B for mail security is generated and may be used as a reset function to reset the security code record in the KSDB 30 and KSDB 78 for mail security.

The call to the key server 16 or key server 76 for mail security may be made once a month, once few weeks, or whenever the caller has compromised or forgotten the random code 30D or 78D. Businesses may make it more often or less often as part of their security policy and procedures.

Where, a fee is implemented to provide this service, the call may be made once a month or even once a year and a fee is billed to the business or the caller. Each of these calls from each of the users of the Internet may be made any time and are not in any way synchronized with other callers, and each random code 30D or 78D is specific to a particular call, caller id 12, cell location, and date/time stamp.

Therefore, the PSVA System described in this invention does not create considerable additional telephone and Internet traffic. The traffic is nominal and is considered reasonably necessary to realize the benefits of the invention. The telephone calls are made within the local area codes to preset numbers and are of very brief duration lasting less than a minute. Therefore, these calls do not create any extraordinary cost and/or time burden on the users of the Internet.

For example, if each caller makes a call once every month, and assuming there are 5 million potential users in an area code, then the call rate is 5 Million divided by 30×24×60×60=2 calls per second on average per Key server. Number of validation queries to the Key server by the mail server or the major router would also be 5 million per month, again generating an Internet traffic to the Key server of 2 queries/second or less. These loads on each key server of a set of distributed key servers are considered nominal.

Key Servers 16 and 76

A key server is illustrated with reference to FIG. 3A. The Key servers are standard servers that have been adapted with a telephone network interface 336, an interactive voice response (IVR) system 338, and a set of call security and packet source validation software functions that are described later.

The Key servers are capable of high volume processing, including receiving many calls at the same time, and use a key server database 30 and 78. Since each server is restricted to receive calls from only certain area codes, the server capacity may be sized to correspond to the number of users in that area code.

In the distributed set of key servers, each key server is adapted with an interface to the telephone network 336 and can only receive calls from the telephone network. Each key server in addition to the standard set of operating system 302 has special functions. These special functions are: a call security function 304, a Key function 306 that includes a key generation function, a key distribution function, a key validation function, and may also have a fee function. Each key server in addition to the telephone network interface 336 with an interactive response system 338 also has a global network interface 332 to be able to receive validation queries and respond with validation message responses to major routers 44A and mail servers 72B on the Internet. The key server may also have an Internal Network Interface 334, which may be used to monitor the status and operation of the key server.

The distributed set of key servers are independent of each other and are assigned to countries and area codes within each country. Each server has an identity that is defined by a country code and a set of area codes within that country. This identity along with the call security function is used to receive calls from the specific countries and specific area codes within that country.

The key servers are specific to an area code and may be provided by the telephone companies themselves. The functions of the key server may be split, where the Call Security Function is be provided by the telephone company and the remaining part of the key server functions may be provided by and managed by the Internet authority that manages and oversees the major routers.

Figure 3A:
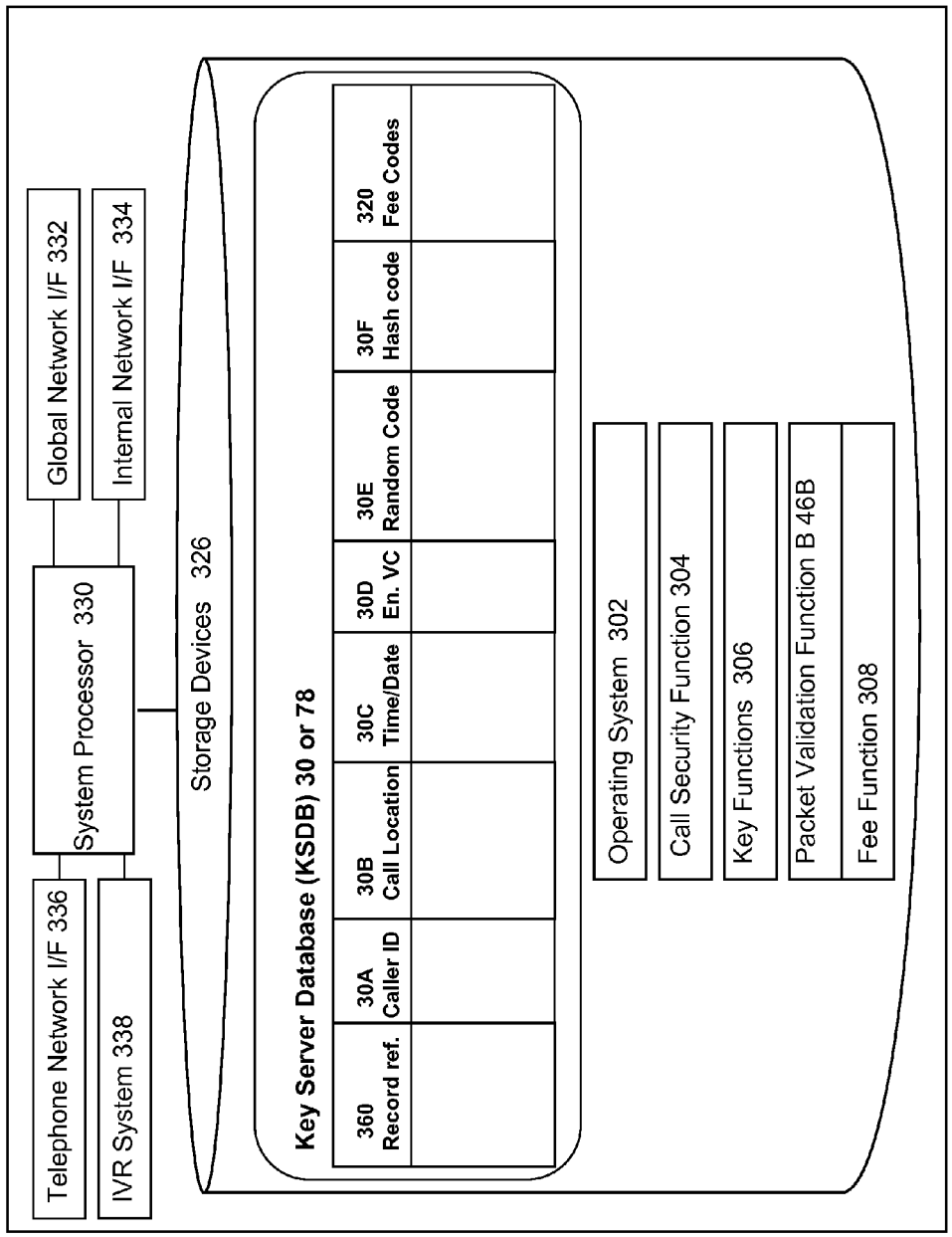
FIG. 3A is a block diagram that illustrates a version of the key server of the current invention.

With reference to FIG. 3A, the key server has the traditional server functions adapted with the key server functions. These adaptations are described herein.

Call Security Function (CSF) 304

The CSF in the key server provides call security. This call security can be provided in many different ways. One of the ways is to maintain a phone number list, which excludes all phones whose ownership cannot be verified.

A Phone list function may be used to screen caller ids that are acceptable and the types of caller ids and the fee to be charged for each caller id. These phones may fall in the category of public telephones; mobile phones used by a business to rent to others, and phones that are shared by many. If a call is received from a caller id, which cannot be screened with the help of the phone list, an authorized call message may be delivered to the caller.

The phone list function may provide management of such a phone list and each caller id may be tagged with knowledge of landline phone or mobile phone. For a mobile phone with the help of the telephone network the cell location where the call originated can be captured. In addition, future mobile phones may have 911 capabilities to know where the call originated. These technologies can be leveraged as part of the call security function in different ways.

Thus the CSF 304 verifies that the caller id of the call is acceptable based on the phone list. In addition, call security function also verifies the call originated from being in the same area code and from a mobile phone. After a call is thus verified, the data relevant to the call is saved and a key is generated as described in the next function.

Key Functions 306

The key functions include the following sub-functions:

Key Generation Function (KGF)

The KGF, after a call is verified, for each call generates a 4 to 6 digit random number and saves in a key server database (KSDB), (i) call location identification, (ii) call date and time, (iii) country code, area code, caller id, (iv) the random number generated for a received call, (v) an encrypted validation code made up of the caller id and the random code, where the random code may be used as the encryption key, and (vi) a hash code that is derived from hashing all these fields.

Key Distribution Function (KDF)

The KDF voice delivers the 4 to 6 digit random code to the caller after the call security function has validated the caller id. Other means to deliver the code may be used such as text messaging. However, the voice delivery using a voice response system in the server is the preferred embodiment, as part of enhanced security to ensure that a person is part of the loop for receiving and using the random code. It is believed, that data store and forward system of text messaging may be susceptible to security weaknesses.

Key Server Database (KSDB) 30

As shown in FIG. 3A, the KSDB is part of the key server 16. The KSDB 30 stores key records for each received and verified call by the Call Security Function 304. The key record may have fields of: a record sequence or reference number 360, caller id 30A, call date and time stamp 30C, call location code 30B, random code 30E, encrypted Validation code 30D, hash code 30F, and a fee status fields 320.

The location code 30B is the cell location where the call originated and is captured with the assistance of the telephone company. Random code 30E is a simple randomly generated numeric of a few digits generated for each call. The encrypted validation code (EVC) 30D encrypts the caller id 30A and the random code 30E using the random code 30E as the encryption key. The hash code 30F is derived from hashing all of the other fields of this record using prior art hash algorithms.

Key Server Database (KSDB) 78

The key server database 78 for the second embodiment of the mail security serves a similar purpose as the KSDB 30 and has the similar set of data fields. The KSDB 78 may not need to use the hash codes of KSDB 30.

Packet Validation Function 46

The packet validation function is implemented in two parts. Part A of the function is present in the major routers of the Internet 44A and part B is resident in the Key server 16.

Packet Validation Function Part A 46A:

This function is present in major routers of the global network. This function performs the following tasks:

(i) Verifies that an incoming data packet has a secure data string (SDS) in the header composed of the country code, area code and the encrypted VC that match with data string in a database of the major router 54.

(ii) If the SDS does not match, the major router 44A sends a query including the encrypted validation code to the key server 16, specific to the country code and the area code.

(iii) The major router 44A receives a response to the query, the response includes, the area code, random code and the hash code, and saves the response in the database of the major router 54 and then verifies the SDS as described in paragraph (i) above.

(iv) If the query response is that the SDS cannot be verified, then send an error message to the sender of the packet or hold the packet for analysis.

(v) If the SDS is verified, as described above, then replace the data string with the hash code and also adds a router id in the packet header of the outgoing packet.

The router id identifies the major router, which performed the validation function. The presence of a valid router id in the packet header enables subsequent major routers to not repeat the packet validation function.

(vi) If the next router leg from a major router 44A or 44B is to a non-major router of the global network, to remove the router id from the packet header, leaving only the hash code in the packet header for the reasons as described below.

An optional security feature of this function is that the major router after verifying the encrypted validation code in the incoming data packets replaces the encrypted validation code with a hash code and also adds a router id code. The Hash code is received from the key server. The hash code masks even the country code and the area code from the secure data string. The Hash code is used later by law enforcement to perform a reverse look up in the key server database to find the caller id, the date and time and the location of the call.

The router id code in the header of a packet identifies the major router that performed the packet source validation for this packet. The presence of a router id code enables the subsequent routers to not repeat the validation and by removing the router id from the router leg that is routed to a sub-network makes sure that the router id code is one of the secret codes that is shared only between the major routers as part of router protocols.

Since, as described earlier, the caller makes these calls to the key server as often as once a month approximately, the number of the random codes, the hash codes and the size of the Key Server database and the major router database is limited and is not growing rapidly with the use of the Internet. Thus the resources needed by key servers are a function of the number of the users of the Internet and not the amount of traffic on the Internet.

Packet Validation Function Part B 46B:

This function is resident in the Key server 16 and performs the following tasks:

(i) Receive a validation query for the secure data string (SDS) from the major router 44A.

(ii) Verify the secure data string with the key record in the Key server database 30.

(iii) Create a hash code for this record. The hash code is made from hashing all other fields of the key record. Hence the hash code is a unique code that identifies by a reverse look up in the Key server database 30, the caller id, and date and time of the call as well as the location of the call, on the legal subpoena of a court judge.

The hash code is created on the first validation query from a major router 44A for a specific SDS. The second embodiment used for the e-mail security, described later, does not have the hash code feature. The destination mail server is the last server of the global network, where the validation is performed.

(iv) On verification of the SDS, send a response that includes the area code, random code, encrypted validation code and the corresponding hash code to the major router 44A.

Fee Function 308

The Key server 16 may have an optional fee function 308 that has (i) a sub-function that advises the caller of a fee for the service and (ii) a sub-function that charges the fee to the telephone bill as identified by the caller id. The fee may be nominal and may be per call fee. For example the fee may be 50 cents for each call.

The fee may be higher for businesses than for individual users. The Call Security Function 304 using a Phone List Function can identify between the business and the individual users.

The fee may be imposed for only the e-mail embodiment and not for the other embodiment. Or it may be imposed for both the embodiments. The fee may be justified as a tax or fee for securing the Internet, and reducing the entry and flow of harm causing data content over the Internet.

The fee function 308 also may notify a sub-function of the call security function 304 to annotate the key record in the key server as fee paid and when the next fee payment is due.

Social Engineering

Social engineering is a technical term used by the information security industry, where the hackers obtain information from unsuspecting public by one or other form deception and then use it to cause harm. It is believed that the PSVA system, as described here overcomes this weakness because the caller id, geographic location, and time of call are captured as part of source validation of data packets. Knowing that information would be available to the law enforcement enabling them to more effectively find and prosecute hackers, to that degree, it will discourage the hackers from using the Internet from causing harm to others. Furthermore, when the hackers learn that the harm causing packets do not even reach the recipients, without the verification of the source validation code, they are less likely to send harm causing packets over the Internet.

Adapted Router 44

The major routers of the Internet are adapted with a packet validation function part A 46A, as described earlier. The adaptation is necessary for only the major routers of the Internet and not for all routers. The major routers are defined based on the node hierarchy of the network. The first level nodes are the major routers. The definition of the major router may also include the routers at the next node level. The router adaptation checks the presence of a source validation code in the header of each incoming data packet and routes only those packets that have the source validation code. The adaptation after checking the presence of the source validation code, verifies the source validation code with reference to a key server. The adaptation also enables the routers to perform the validation once and not repeat the validation at each major router by use of a router id code as described earlier and described later as router id function 312 with the help of FIG. 3B.

Figure 3B:
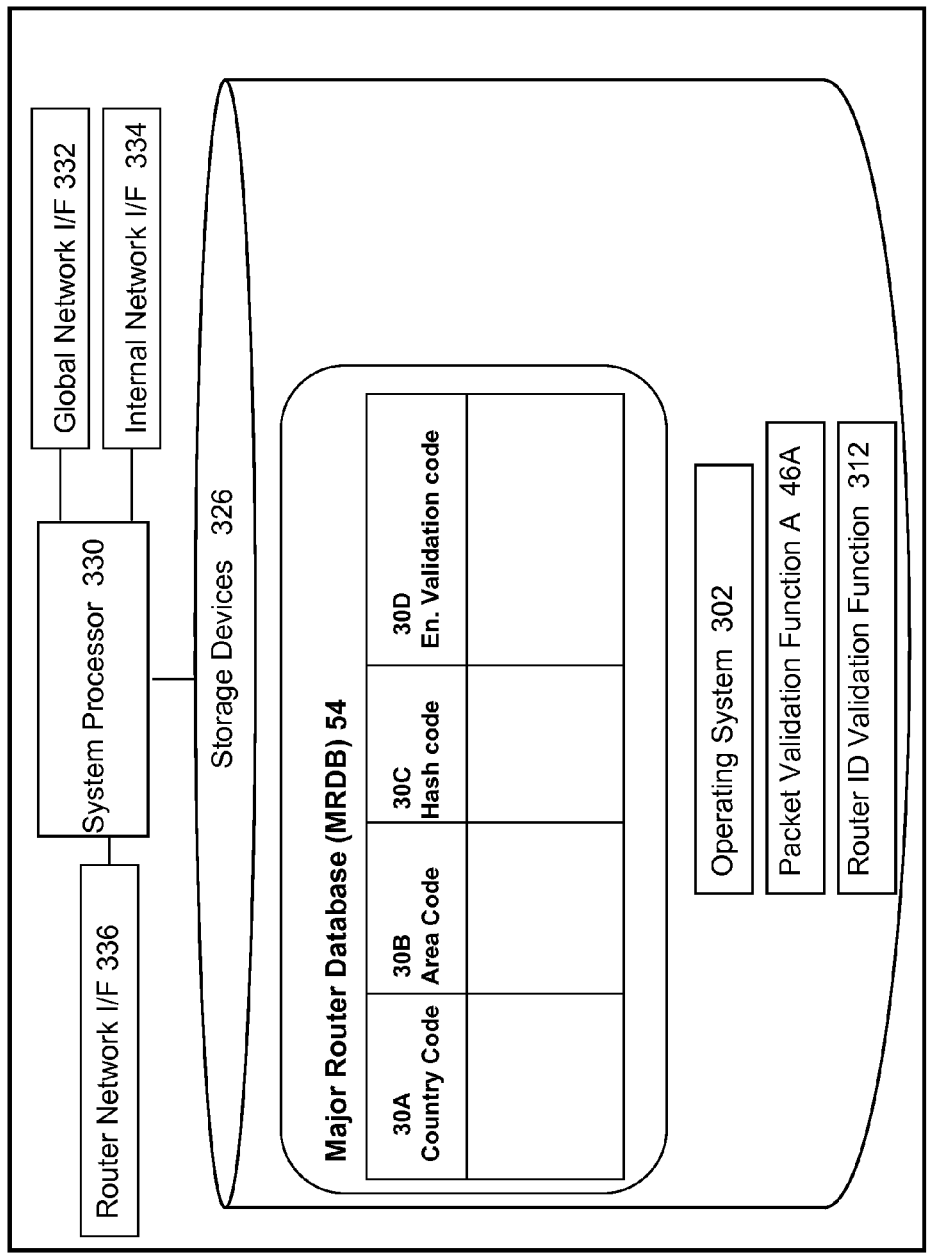
FIG. 3B is a block diagram that illustrates a version of the adaptation of the major router of the current invention.

Referring to FIG. 3B, the adapted router includes (i) a packet validation function part A, 46A, and a major router database 54 in addition to traditional functions of a router (not shown). The packet validation function 46A has been described earlier. The major router database 54 stores the validated codes so that it is not necessary to send a query to the key server for each packet. The database 54 stores the query responses for each unique record and includes, country code, area code, random code, encrypted validation code and the hash code.

Router Id Security Function 312

FIG. 4B shows that the hash code 104 from major router database 54 and a router id security function 312 is used to create the contents of packet header 24B.

The router id function 312 is used to maintain a list of private router identifications that define or identity the routers of the global network. Such router identifications may be used in prior art. The router id function of this invention may use those router ids or create a new set of router identifications. Such router identification is used in this invention by a major router to identify a data packet in the data packet header, which performed the packet source validation function. Once the packet is so identified, the subsequent routers that receive a routed packet with a secure router identification will then not repeat a packet source validation function. The last major router in the network may remove the router identification from the header, so that such router identifications remain private.

Client Security Function 22

As shown in FIG. 1A, the Client Security Function is resident in the sending and receiving clients and has three functions: (i) Secure Data String (SDS) function 22A, (ii) Network Adaptation Function (NAF) 22B, and (iii) Security Cookie Function (SCF) 22C.

The SDS function 22A displays a login page 64 when the user PC, as a sending client 10A has established a network connection. The user enters the country code, the telephone number and the random code in window 64.

As illustrated with reference to FIG. 4A, the SDS function 22A then creates a secure data string for packet header 24A. The SDS, as illustrated is made up of country code, area code, and a string made up of encrypted caller id and random code, where the random code is used as the encryption key. The secure data string is then saved in a temporary area of the memory of the client 10A before being used by the Network Adaptation Function 22C for embedding as packet header 24A.

The encryption key may be derived form the random code 30D itself. There can be many types of encryptions such as simple offsets and reverse digits etc. The specific encryption technique and its key may be the code itself. For example, if the validation code, composed of the caller id and the random code is 310 787 1460 B347, then encrypted validation code may then become 689 212 8539 4679.

As shown in FIG. 4A, the NAF 22B, on each outgoing packet adds the secure data string in the header packet. The packet standard permit the addition of additional data in the header as defined in the RFC 791 standard.

With reference to FIG. 4A, an Internet Protocol RFC 791 Internet Standard for IP data packets has a header part 112, an option data part 116 and a data part 114. The header part 112 has data fields such as: Ver., IHL, Type of service, Total length, Identification, Flags Fragment Offset, Time to Live protocol, header checksum, source address and destination address. The optional data part 116 has fields such as Option type, Length, and Option data.

Trojan Horse Security

Since a prevalent security weakness is that a Trojan horse may take over or hijack some one's computer without their knowledge, and use it to send internet traffic in the form of either mail or other data packets using the hijacked computer as the sending computer, a security feature is provided herein to thwart such a possibility This security feature is that the SDS is not saved in the computer on the hard disk in a file. Instead, when the SDS is created, it is stored in some random part of the free RAM and the address of that RAM is then saved in the NAF. The NAF 22B reads the RAM for the data string, when sending out the packets. When the computer is powered down the Secure Data String is destroyed. When the computer is powered up again, the process of entering the caller id and the code is repeated and the Secure Data String is computed anew and saved anew in a new random part of the memory for use by the NAF. When the packets are sent, the NAF uses this new Secure Data String at a new location in the RAM for embedding in the header of the packet.

Each time a computer is powered up, the user can use the code received previously or make a new call to the Key server to receive a new random code.

As shown with reference to FIG. 1A, the SCF function 22C for every received file, by a receiving client 10B, extracts the hash code or the SDS from the header and saves in a security cookie file 22D, the name of the file 22D-1, the date of the file 22D-2 and the hash code 30E.

If the file 22D-1 that is received causes a specific harm, from a list of approved harms; the file along with the has code 30E is turned over to the law enforcement agency and is used by them with the help of the Key server database 30 to trace the caller id and the location and time of the call.

The Operation

The steps of the Internet adaptation for enhanced Internet security are described here. Not all of these steps may be necessary and not all of these steps may be performed in the order as listed here. The description of these steps relies on the above description.

At Step 1, the user powers up the computer and when the network connection is present, Client Security Function displays a window asking for entry of cell# and RC.

At Step 2, a user using his/her cell phone dials a set number within his/her own area code.

At Step 3, a Key Server (KS) for that area code receives the call. A Call Security Function in the KS verify the caller id, records cell location, date/time stamp and generate a Random Code (RC) and voice deliver the RC to the caller as well as save in KSDB.

At Step 4, the user enters the information (cell # and RC) in the window of Client Security Function. The Client Security Function encrypts the VC (caller id plus RC) using RC as the key and saves the EVC in a random temporary memory with an address that is saved in a Network Adaptation Function.

At Step 5, when the user sends data over network, the Network Adaptation Function using the memory address reads the encrypted VC and embeds it in each outgoing Packet header.

At Step 6, the first major router of the global network that receives this packet performs a Packet Validation Function as follows:

1. Receive packet and extract the area code and encrypted VC
2. Using area code, find the en. VC in MRDB
3. IF (EVC found in MRDB) THEN Decrypt EVC using RC to verify RC
4. IF (RC verified) THEN Replace area code and EVC in Packet Header with the HC in the MRDB and Set Router ID and route to next router.
5. Else IF (RC not verified) Send error message to sender.
6. Else IF (EVC not found in MRDB) send a query to KS for area code.
7. IF (KS find EVC in KSDB) KS compute HC (caller id+location code+date-time stamp+random code) and send RC, EVC, and HC to major router (MR). Then MR receives response and save RC, EVC and HC in MRDB.
8. MR replaces EVC in Packet Header with HC from MRDB, set Router ID and route further.
9. Else IF (KS not find EVC in KSDB) Send reject message to MR.
10. MR then send error message to sender or discard packet.
11. Other major routers when see Router ID in header do not repeat validation function.
12. The last major router removes the router id from header of the packet.

At Step 7, the receiver receives packets with HC in header.

At Step 8, Client Security Function extracts HC and saves in a security cookie file in a non-deletable part of the storage, the file name and the HC.

At Step 9, A user on finding a specified harm, turn the security cookie file or the file and the corresponding hash code and date to law enforcement.

At Step 10, Law agency verifies harm for one of a kind of a specified harm from harm list. Seek court order and ask Key Server entity to disclose for this HO, the caller id, cell location and date/time stamp. Law finds the probable sender to further investigate and prosecute.

Second, E-Mail Security, Embodiment

This second embodiment is limited in scope to provide validation of only the e-mail packets that travel from one mail server to the destination mail server on the Internet.

This embodiment uses a simplified version of the same PSVA as described in the first embodiment. The sending mail clients or the sending mail servers are adapted with functions that insert a validation code in the header of each packet of outgoing mail. The destination mail servers are adapted with a Packet Validation Function.

Hence, this embodiment may be implemented by businesses one at a time, as this embodiment does not affect the Internet per se and is implemented only in the mail servers. The destination mail servers may require it from sending mail servers as part of added security.

Key Server Adaptation for E-Mail Embodiment 76

The key server 76 is similar to the key server 16, described earlier with reference to FIG. 3A. The key server 76 has a packet validation function 46B that has a sub-function that receives a validation query from a mail server, the query containing at least the area code and the encryption validation code; a sub-function that matches the area code and the encrypted validation code in the key server database to find a key record; a sub-function that uses the random code of the record to decrypt the encrypted validation code and verifies the caller id; and a sub-function that responds to the query with an OK message to the mail server. There is no hash code in the key server 76, as there is in the key server 16.

The key server may also have a phone list function that maintains the entry and deletion of caller ids on the caller id list, as described earlier as part of the Call Security Function 304 with reference to FIG. 3A.

Sending Mail Server/Client Adaptation 88

With reference to FIG. 2A, the PSVA system may use an adapted mail program in a mail-sending client, the adaptation called mail security function has:

(i) Mail Security Function 88A that is invoked when Outgoing Folder 84B has outgoing messages and the Send/Receive function 84A is activated. Then the function 88A displays a mail security function window 86 that enables the input of, the random code, the country code, and the caller id of a telephone number.

(ii) Encrypted Validation Code Function 88B, that encrypts the called id and the random code using the random code as an encryption key, then labeled as the encrypted validation code and stores in a temporary memory of mail client 82A.

(iii) Network Adaptation Function 88C, that reads the data from the temporary memory embeds the secure data string made up of country code, area code, and the encrypted validation code in the header of each outgoing mail packet from the mail program.

When web mail is used, the mail-sending client is a mail server 72A, which handles a plurality of mail sending clients 70A. Then the mail server 72A has a function that requests and receives caller id and the random code via web interface and performs the other functions as identified above.

Destination Mail Server Adaptation 72B

Figure 3C:
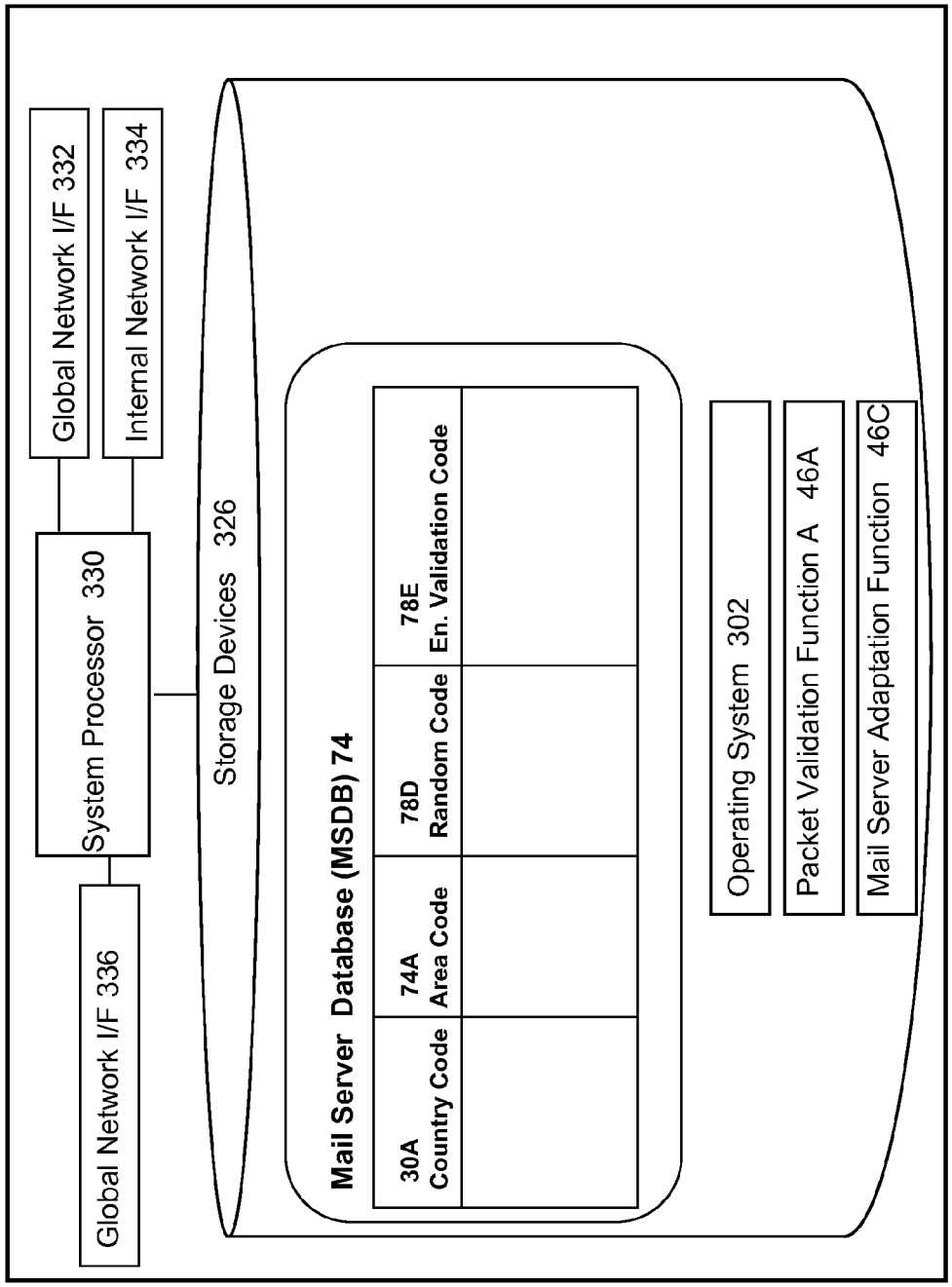
FIG. 3C is a block diagram that illustrates a version of the adaptation of the mail server of the current invention.

With reference to FIGS. 2B and 3C, the PSVA system may use an adapted mail server program 46C, the adaptation has:

(i) A sub-function that saves data packets of an incoming e-mail file in a temporary area of memory and extracts the secure data string that has country code, area code and an encrypted validation code in the header of the packet.

(ii) A sub-function compares with the encrypted validation codes in a mail server database, and when not being successfully compared, sends the area code and the encrypted validation code to a pre-identified key server for the specific country code and the area code.

(iii) A sub-function that without receiving an OK from the key server discards all the packets of the file, with receiving an OK from the key server, saves the file name and the encrypted validation code in a mail server database and resume the normal operation of the mail program.

(iv) The mail receiving client being a mail server serving a plurality of mail clients; the mail server forwards the e-mail file to the mail clients with an annotation that the e-mail message has either been validated when an OK response, has not been validated, when there is no data string in the header.

With the PSVA system, Internet users receive mail with each mail message annotated as either validated or not validated from their mail servers. This enables the users to receive all mail messages, those with validation and those without validation. Over time, the users can notify the mail senders that they would like to receive source validated mail messages only. Therefore, a benefit of the PSVA system as described here is that the PSVA system can be gradually adopted by those mail senders and mail receivers who value the security of the source validation of the mail messages. This feature, it is believed will curtail unwanted and specifically harm causing mail from being sent in the first place by the virus distributors.

The Operation

The steps of the Internet adaptation for enhanced e-mail security are described here. Not all of these steps may be necessary and not all of these steps may be performed in the order as listed here. These steps are based on the above description.

At Step 1, the user opens his mail program. A Mail Security Function displays a window asking for entry of cell# and RC.

At Step 2, a user using his/her cell phone dials a set number within his/her own area code.

At Step 3, a Key Server for that area code receives the call. A Call Security Function in the KS verify the caller id, record cell location, date/time stamp and generate a Random Code (RC) and voice deliver the RC to the caller as well as save in KSDB.

At Step 4, the user enters the information (cell # and RC) in the window. The Mail Security Function encrypts the VC (caller id plus RC) using RC as the key and saves the EVC in a random temporary memory with an address that is saved in a Network Adaptation Function.

At Step 5, when the user sends mail, the Network Adaptation Function using the memory address reads the encrypted VC and embeds it in each e-mail outgoing Packet header to mail server. At Step 6. The receiving mail server on the global network that receives this packet performs a Packet Validation Function as follows:

1. Receive packet and extract the area code and EVC
2. Using area code, find the EVC in MSDB.
3. IF (EVC found in MSDB) THEN check RC
5. Else IF (EVC not found in MSDB) send a query to Key server for area code.
6. IF (KS find EVC in KSDB) Then KS send RC, EVC, to Mail Server (MS). Then MS receive response and save EVC in MSDB.
7. The mail server routes mail to client with [SAM] validation annotation.
8. The mail client receives e-mail with [SAM] annotation.

In summary, the Packet Source Validation Architecture (PSVA) system has a set of key servers 16 and adapted major routers 44, adapted mail servers 72, and a Client Security Function 22. The PSVA system enables the source of each data packet to be validated by the major router. The PSVA system provides enhanced network access security by providing a solution to the fundamental weakness of the Internet architecture in not being able to authenticate the source of the packets entering the packet.

For the e-mail security embodiment, the PSVA system enables the sending mail servers to insert a validation code in the header of outgoing packets and the destination mail servers can validate the code with reference to the key servers. The PSVA system thus provides enhanced e-mail security by providing a solution to the fundamental weakness of the Internet architecture in not being able to authenticate the source of the e-mail packets entering the packet. These security enhancements, it is believed will discourage the senders from sending harm causing e-mail over the Internet.

While the particular method and apparatus as illustrated herein and disclosed in detail is fully capable of obtaining the objective and providing the advantages herein before stated, it is to be understood that it is merely illustrative of the presently preferred embodiments of the invention and that no limitations are intended to the details of construction or design herein shown other than as described in the appended claims.

What is claimed is:

1. A system of enhanced global computer network security, comprising:

a. a sending server that includes a processor that generates a data packet that includes a globally unique human signature code in a header of the data packet to uniquely identify a sender of the data packet, the sending server being connected to a global computer network;

b. the sending server includes a function that inserts the globally unique human signature code in the data packet header for the data packets originating from the sending server, where the signature code is of a form that identifies a sender as an owner of the sending server that has control over the server that originated the data packets and the signature code is created with the help of a cellular wireless telephone network; and c. a plurality of key servers on the global computer network that maintain the signature code.

2. The system as in claim 1, comprising:
the signature code maintained in a database of the key server includes fields of, (i) a caller id of a mobile telephone provided by a cellular telephone network, (ii) a time and a date of a call to the key server, (iii) cellular network identification of a geographic location of a caller, and (iv) a random code.

3. The system as in claim 1, comprising:
the signature code is created and maintained by the plurality of key servers.

4. The system of claim 3, the key server comprising:
a. a separate key server from the plurality of key servers is provisioned for each country and area code of the telephone network, wherein each of the servers receives calls from mobile phones from the same area code;
b. a call security function in each of the key servers that verifies the call from being in the same area code and from a mobile phone, and saves in a key server database, (i) call location identification, (ii) call date and time, (iii) caller id, (iv) a random number generated for a received call, (v) an encrypted validation code made up of the caller id and the random code, and (vi) a hash code derived from hashing all these fields.

5. The system as in claim 1, the function to insert the globally unique human signature code in the header of the data packet, comprising:
a. a client security function resident in a source computer connected to the global network, which (i) displays a window for the entry of a cell telephone number and the random code, collectively called a validation code, (ii) encrypts the validation code and temporarily saves it; and
b. a network adaptation function that embeds in each outgoing packet header to the network the area code and the encrypted validation code.

6. A method of enhanced global computer network security, comprising the steps of:
a. generating a data packet by a sending server that includes a processor, including in the data packet a globally unique human signature code in a header of the data packet to uniquely identify a sender of the data packet, the sending server being connected to a global computer network;
b. having in the sending server a function that inserts the globally unique human signature code in the data packet header for the data packets originating from the sending server, where the signature code is of a form that identifies a sender as an owner of the sending server that has control over the server that originated the data packets and creating the signature code with the help of a cellular wireless telephone network; and
c. maintaining the signature code by a plurality of key servers on the global computer network.

7. The method as in claim 6, comprising the steps of:
including in the signature code, (i) a caller id of a mobile telephone provided by a cellular telephone network, (ii) time and date of a call to a key server, (iii) cellular network identification of the geographic location of the caller, and (iv) a random code.

8. The method as in claim 6, comprising the steps of:
creating and maintaining the signature code by the plurality of key servers.

9. The method as in claim 8, the key server comprising the steps of:
a. maintaining a separate key server, in the plurality of key servers, for each country and area code of the telephone network, receiving calls by the server from mobile phones from the same area code;
b. verifying by a call security function in each of the key servers the call from being in the same area code and from a mobile phone, and saving in a key server database, (i) call location identification, (ii) call date and time, (iii) caller id, (iv) a random number generated for a received call, (v) an encrypted validation code made up of the caller id and the random code, and (vi) a hash code derived from hashing all these fields.

10. The method as in claim 6, comprising the steps of:
a. enabling a client security function resident in a source computer connected to the global network, which (i) displays a window for the entry of a cell telephone number and the random code, collectively called a validation code, (ii) encrypts the validation code and temporarily saves it; and
b. enabling a network adaptation function that embeds in each outgoing packet header to the network the area code and the encrypted validation code.

* * * * *